June 25, 1968 J. R. JONES ETAL 3,390,347

SAMPLE AND HOLD CIRCUIT

Filed Jan. 10, 1966

*INVENTORS*
JACKIE R. JONES
HJALMAR OTTESEN

By Edward S. Gershuny
AGENT

United States Patent Office 3,390,347
Patented June 25, 1968

3,390,347

SAMPLE AND HOLD CIRCUIT

Jackie R. Jones, Campbell, Calif., and Hjalmar Ottesen, Boulder, Colo., assignors to International Business Machines Corporation, Armonk, N.Y., a corporation of New York Filed Jan. 10, 1966, Ser. No. 519,577
2 Claims. (Cl. 330—51)

This invention relates to sample and hold circuits, and more particularly to sample and hold circuits which use only one amplifier.

As the name implies, a "sample and hold circuit" is used to first sample a signal present at its input and then, at a later time, make the signal available at its output. Prior to this invention, sample and hold circuits were generally complex devices which utilized a plurality of amplifiers. Those circuits which utilized only one amplifier had a storage capacitor connected in the feedback path of the amplifier and were still relatively complicated. Also, previous sample and hold circuits which utilized only one amplifier did not have a high enough input impedance to prevent distortion of an input signal.

It is therefore an object of this invention to improve sample and hold circuits which utilize only one amplifier.

It is a further object of this invention to provide a sample and hold circuit which utilizes only one amplifier and still has a high input impedance.

Another object of this invention is to provide a simple and inexpensive circuit to accomplish the above.

In order to accomplish the above objectives, there is provided a circuit which comprises a potentiometric amplifier, a storage capacitor, and three switches. One setting of the switches will put the circuit in its "sample mode" in which a signal presented at the input of the circuit will charge the storage capacitor to provide a sample of the signal. Another setting of the switches will put the circuit in its "hold mode" in which the circuit is isolated from the signal at the input and a manifestation of the sample stored by the storage capacitor is available at the output of the circuit.

The simplicity of this circuit leads to several advantages over the prior art. Because the circuit uses few components, it is inexpensive and quite compact. It also requires much less power than do existing sample and hold circuits.

Another advantage is that the high input impedance of this circuit will prevent it from distorting the signal to be sampled when the circuit is in its sample mode. When the circuit is in its hold mode, the sampled and held voltage is completely isolated from the input signal. The sampled and held voltage is also isolated from the load.

Further advantages of this circuit are increased reliability and increased stability.

The foregoing and other objects, features and advantages of the invention will be apparent from the following more particular description of a preferred embodiment of the invention, as illustrated in the accompanying drawings.

Figure 1:
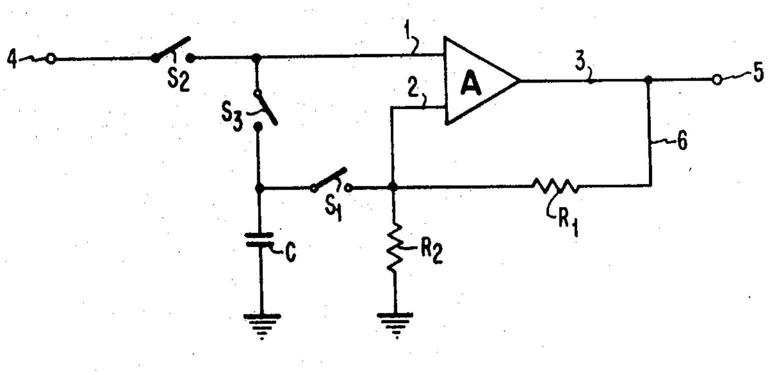
FIG. 1 is a circuit drawing of a preferred embodiment of this invention.

Referring to FIG. 1, it will be seen that a preferred embodiment of the circuit includes an amplifier A. In order to provide a high impedance to the input signal, the amplifier A is connected in a potentiometric configuration with two inputs 1 and 2, and a single output 3. This well-known amplifier configuration has a high input impedance and a low output impedance. The output 3 of the amplifier A is connected to the second input 2 of the amplifier through feedback loop 6. The feedback loop 6 may also contain an impedance $R_1$ for reasons to be explained below. One terminal of a resistor $R_2$ is connected to the point of connection between feedback loop 6 and the second input terminal 2 of the amplifier A. The other terminal of the resistor $R_2$ is connected to a reference potential. FIG. 1 shows the reference potential to be ground, but it is recognized that others could be used. To connect the input terminal 4 of the sample and hold circuit to the first input terminal 1 of the amplifier A when the circuit is in its sample mode, there is provided a switch $S_2$. In order to store a sampled signal, a storage capacitor C is provided. One terminal of the storage capacitor C is connected to a reference potential. Although FIG. 1 shows the reference potential to be ground, it is recognized that other reference potentials could also be utilized. When the sample and hold circuit is in the sample mode, the storage capacitor C will be connected to the second input terminal 2 of the amplifier A through the switch $S_1$. When the device is in its hold mode, the second terminal of the storage capacitor C will be connected to the first input terminal 1 of the amplifier A through the switch $S_3$. Although it is recognized that many different types of switches could be used for the switches $S_1$, $S_2$, and $S_3$, it is preferred that field effect switches be used. These switches are fast and offer very low off-set voltage and good isolation.

*Operation*

Figure 2:
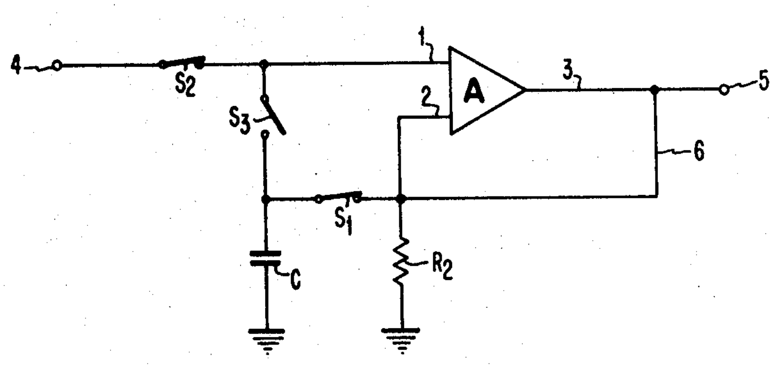
FIG. 2 shows the circuit in its sample mode.

*Sample Mode.*—Referring to FIG. 2, in order to sample an input signal present at the input 4 of the circuit, switches $S_1$ and $S_2$ are closed, while switch $S_3$ is opened. When the circuit is in this condition, it is said to be in its "sample mode." When the circuit is in its sample mode, the capacitor C will be charged by the amplifier A to a voltage $E_c$ which bears a known relationship to the input signal presented at the input terminal 4. For example, if the input signal is a D.C. signal of value V, then the storage capacitor C will be charged to a value V; if the input signal is a high-frequency sinusoid, then the storage capacitor C will be charged to a value equal to the root mean square (RMS) value of the input signal. As is known in the art, the final value $E_c$ to which the storage capacitor C will charge depends upon such factors as the characteristics of the input signal, the characteristics of the amplifier A (e.g., input impedance, frequency response) and the value of the storage capacitor C. When the storage capacitor C is charged, the sample mode is complete.

Figure 3:
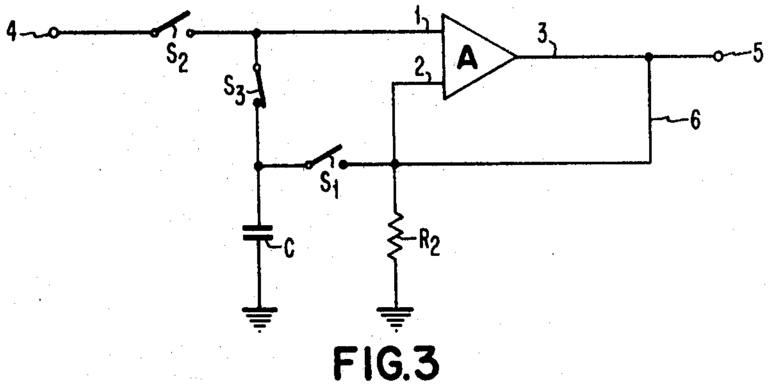
FIG. 3 shows the circuit in its hold mode.

*Hold mode.*—Referring to FIG. 3, in order to obtain the sampled signal at the output 5 of the circuit, switches $S_1$ and $S_2$ are opened, and switch $S_3$ is closed. The circuit is then in its "hold mode." As shown in FIG. 3, with switch $S_2$ open the input signal present at the input terminal 4 of the circuit is now completely isolated from the output terminal 5 of the circuit. The voltage $E_c$ across the storage capacitor C is applied to the first input terminal 1 of the amplifier A. As was explained above, the voltage across the storage capacitor is approximately equal to the average value of the input signal. The voltage appearing at the output terminal 5 of the circuit will then be equal to $E_c$, which is approximately equal to the average value of the input signal. Because of the high input impedance of the amplifier A in its potentiometric configuration, the voltage across the storage capacitor C will decay very slowly, and hence the voltage at the output terminal 5 of the circuit will remain relatively constant.

Although the circuit has been described assuming a voltage gain of 1, a different gain can be obtained by adding an impedance $R_1$ into the feedback loop 6 as shown in FIG. 1. In this case, recognizing that the input impedance of the amplifier A is much greater than $R_2$, the voltage appearing at the output terminal 5 of the circuit would be equal to $E_c(R_1+R_2)/R_2$. However, it is recognized that the introduction of an impedance $R_1$ into the feedback loop 6 would increase the amount of time that it takes to charge the storage capacitor C to a final value $E_c$ which is approximately equal to the input signal, and the sample and hold circuit would therefore have to be in its sample mode for a greater period of time.

While the invention has been particularly shown and described with reference to a preferred embodiment thereof, it will be understood by those skilled in the art that various changes in form and details may be made therein without departing from the spirit and scope of the invention.

What is claimed is:

1. A sample and hold circuit comprising:

a potentiometric amplifier having first and second inputs and an output, said output being connected through a feedback loop to said second input;

a storage capacitor;

first switch means connecting said storage capacitor to the second input of said potentiometric amplifier when said circuit is in its sample mode;

second switch means connecting an input signal to the first input of said potentiometric amplifier when said circuit is in its sample mode; and third switch means connecting said storage capacitor to the first input of said potentiometric amplifier when said circuit is in its hold mode;

said potentiometric amplifier charging said storage capacitor while presenting a high impedance to the input signal when said first and second switch means are closed and said third switch means is open to put the circuit in its sample mode, and amplifying the signal stored by said storage capacitor when said first and second switch means are open and said third switch means is closed to put the circuit in its hold mode.

2. The sample and hold circuit of claim 1 wherein:

said feedback loop includes an impedance so that the signal stored by said storage capacitor will be further amplified when the circuit is in its hold mode.

References Cited

UNITED STATES PATENTS 3,116,458 12/1963 Margopoulos ----- 328—151 X

ROY LAKE, *Primary Examiner.*

NATHAN KAUFMAN, *Examiner.*